W. B. Barnard,

Wick Trimmer,

No. 2,474, Reissued Feb. 12, 1867.

Inventor:
William B. Barnard
By Robbins & Burr
Atty's.

Witnesses:
H. King
Randolph Coyle Jr.

AM. PHOTO-LITHO. CO. N.Y. (OSBORNE'S PROCESS.)

United States Patent Office.

BARNARD, SON & CO., ASSIGNEES OF WILLIAM B. BARNARD, OF WATERBURY, CONNECTICUT.

*Letters Patent No.* 45,574, *dated December* 27, 1864; *reissue No.* 2,209, *dated March* 27, 1866; *reissue No.* 2,474, *dated February* 12, 1867.

IMPROVEMENT IN SHEARS.

The Schedule referred to in these Letters Patent and making part of the same.

TO ALL WHOM IT MAY CONCERN:

Be it known that I, WILLIAM B. BARNARD, of Waterbury, in the county of New Haven, and State of Connecticut, assignor to Barnard, Son & Co., of said county and State, having invented certain new and useful Improvements in the Manufacture of Lamp Trimmers, Shears, and similar cutting instruments, which through inadvertence and mistake have been heretofore imperfectly and indistinctly described by me in applying for and securing Letters Patent thereon, do now hereby declare that the following is a full and exact description thereof, reference being had to the accompanying drawings, forming a part of this specification, and in which—

Figure 1:
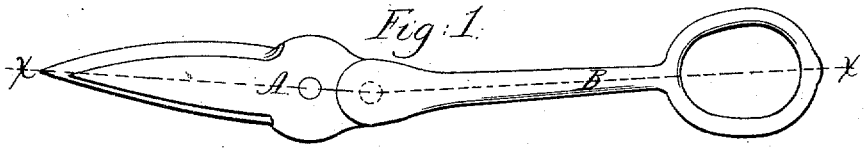

Figure 1 is a plan view of the handles of a pair of lamp-trimmer shears, with the cutting blade attached.

Figure 2:
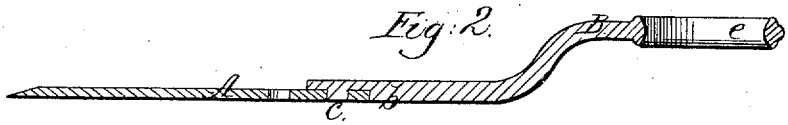

Figure 2, a longitudinal section, in the line *x x* of fig. 1.

Figure 3:
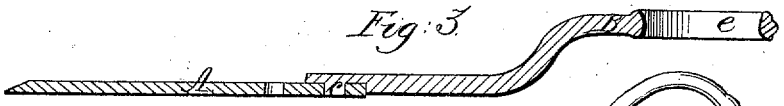
Figure 4:
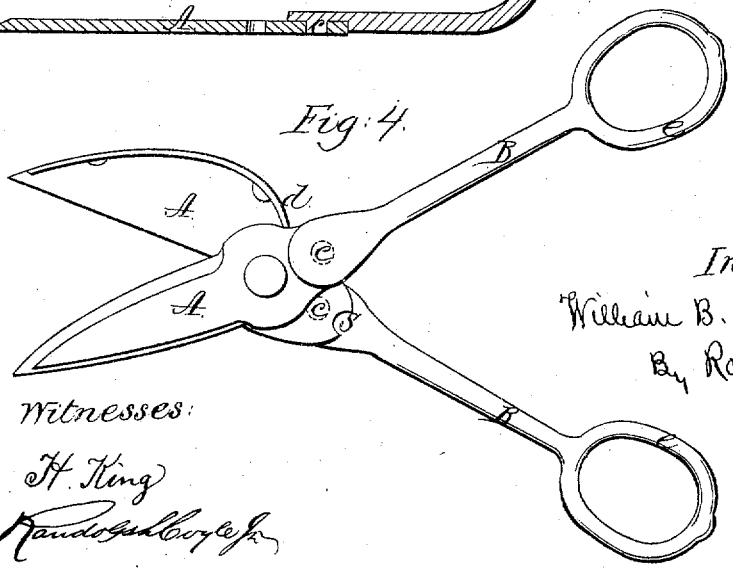

Figure 3, a similar section, showing the blade and handle when riveted together and before the blade is ground down and finished; and Figure 4, a plan view of a finished pair of lamp-trimmer shears opened.

Similar letters indicate like parts in each of the drawings.

My improvement in the manufacture of lamp-trimmers, shears, or similar cutting instruments, consists in uniting the handle to the cutting blade in each division of the shears, formed without offsets or shoulders projecting above the face of the inner end or tang of the blade at its juncture, *y*, with the handle, by means of rivets which are homogeneous with said handles.

The handles B B of my improved shears may be made of wrought or malleable iron, brass, or other suitable metal. The end *b* of each handle is rebated or recessed (as seen in the sectional fig. 2) to a depth not quite equal to the thickness of the inner end or "tang" 2 of the steel blade A, to be secured thereto, so that the shoulder formed by the inner end or edge of the rebate shall not project above the face of the blade at the line or point of juncture of the two. This rebate or recess in the end of each handle is made to coincide in form with the end of the blade to be fitted therein, and hence may be of any desired shape. Each blade, A, is best secured to its proper handle, B, by means of a rivet, *c*, formed or cast in one piece with the handle, and left to project from its rebate or recess. This rivet *c* is made to pass through an aperture pierced in the inner end or "tang" *a* of the blade to receive it, and is therefore headed upon the exterior surface of said tang, as illustrated in figs. 2 and 3. Two or more rivets may be used, but one is ordinarily sufficient. When the end *a* of the blade is rounded, and but a single rivet, *c*, is used, a tongue or projection, *s*, (fig. 4,) should be formed upon the inner edge of the rebate, to fit into a corresponding notch or recess in the tang *a* of the blade, to prevent the blade from turning on the rivet. Where a square or an angular joint is formed at the juncture or union of the blade and handle, this notch *s* is not required. Each blade A may be tempered and hardened equally from end to end before being united to its handle as just described, and when first secured thereto may be left projecting above the handle at the juncture *y* of the two, as illustrated in fig. 3, so as to be subsequently ground down and finished flush and even with the end of the handle, to present a neat appearance, as seen in fig. 2.

Having thus fully described my improved mode of constructing lamp-trimmers, shears, and other similar cutting instruments, I do not claim as new the simple combination of steel blades to suitable handles by means of rivets, but what I claim as my invention, and desire to secure by Letters Patent, is—

Uniting the blades and handles of shears, lamp-trimmers, and similar instruments, by means of one or more rivets homogeneous with said handles, in combination with a rebate or recess of any suitable form, made in the end of the handle to receive the inner end or tang of the blade, when the shoulder or inner edge of the recess does not project above the face of said tang after it has been properly secured therein, all substantially in the manner and for the purpose herein set forth.

WM. B. BARNARD.

Witnesses:

A. J. BARNARD,

ELIZABETH BARNARD.